(12) United States Patent
Johnson et al.

(10) Patent No.: US 7,867,352 B2
(45) Date of Patent: Jan. 11, 2011

(54) COMPOSITE MATERIAL PLACEMENT METHOD AND SYSTEM

(75) Inventors: Brice A. Johnson, Federal Way, WA (US); David J. Carbery, Vashon, WA (US)

(73) Assignee: The Boeing Company, Chicago, IL (US)

( * ) Notice: Subject to any disclaimer, the term of this patent is extended or adjusted under 35 U.S.C. 154(b) by 1369 days.

(21) Appl. No.: 11/352,274

(22) Filed: Feb. 13, 2006

(65) Prior Publication Data

US 2007/0187024 A1  Aug. 16, 2007

(51) Int. Cl.
B32B 38/04 (2006.01)
(52) U.S. Cl. .................. 156/250; 156/256; 156/193
(58) Field of Classification Search .......... 156/193, 156/250, 360, 256
See application file for complete search history.

(56) References Cited

U.S. PATENT DOCUMENTS

| | | | | |
|---|---|---|---|---|
| 4,867,833 A | * | 9/1989 | McCoy | 156/361 |
| 5,562,788 A | * | 10/1996 | Kitson et al. | 156/64 |
| 2004/0026025 A1 | * | 2/2004 | Sana et al. | 156/256 |
| 2004/0098852 A1 | * | 5/2004 | Nelson | 29/428 |
| 2005/0039843 A1 | * | 2/2005 | Johnson et al. | 156/175 |
| 2006/0090856 A1 | * | 5/2006 | Nelson et al. | 156/510 |
| 2006/0118244 A1 | * | 6/2006 | Zaballos et al. | 156/510 |

FOREIGN PATENT DOCUMENTS

| | | |
|---|---|---|
| DE | 3331494 A1 | 3/1985 |
| EP | 1422048 A2 | 5/2004 |
| GB | 1314065 | 4/1973 |
| WO | WO 2005/106604 A2 | 11/2005 |

OTHER PUBLICATIONS

Auomated Dynamics Company—Technical Papers—Mike Favaloro et al., "Process and Design Considerations for the Automated Fiber Placement Process," presented at Sampe Fall Technical Conference, Oct. 29, 2007, availabe via <http://www.automateddynamics.com/tech_papers_final.php>, last visited Oct. 1, 2009.

* cited by examiner

*Primary Examiner*—Khanh Nguyen
*Assistant Examiner*—Vishal I Patel

(57) ABSTRACT

To apply a course on a layup mold, a ply boundary that defines a ply area on the layup mold is determined and a tape of composite material is applied on the ply area at an oblique angle relative to the ply boundary. In addition, a leading edge of the tape is butt cut and the leading edge, and the ply boundary essentially converge. Furthermore, a trailing edge is generated. The trailing edge is a butt cut and the trailing edge and the ply boundary essentially converge.

9 Claims, 6 Drawing Sheets

COMPOSITE MATERIAL PLACEMENT METHOD AND SYSTEM

FIELD OF THE INVENTION

The present invention generally relates to a system and method of fabricating a composite item. More particularly, the present invention pertains to a system for auto lamination of a composite and its method of use.

BACKGROUND OF THE INVENTION

Composite items are typically fabricated from multiple layers or plies. These plies generally include a variety of materials such as carbon fiber, various other fibers, metal films or foils, and the like. In addition, the plies may be pre-impregnated (if fiber) or coated (if foil) with a resin and are often dispensed from a roll or spool. In roll form, the composite ply material is referred to as "tape" and may or may not include a backing layer. This backing generally prevents resin coated or pre-impregnated ply material (prepreg) from adhering to itself and aids in handling the tape as the tape is applied to the tool and the layup. The tape is applied to tool in a multitude of courses laid side by side to form a ply. The wider this tape is, the fewer the number of courses that need be applied. As such, using wider tape generally increases lay-down rates and speeds fabrication of the composite item. However, increasing the width of the tape increases the size and complexity of the tape cutting device.

In conventional lamination machines, the tape is cut at the beginning and end of each ply to match the profile of the ply being laid. Generally, the starting profile of a course does not match the end profile of the previously applied course. Therefore, conventional lamination machines are required to move away from the tool or mandrel to cut a new profile that matches the beginning of the next course. This procedure wastes time and composite material. In addition, cutting devices are the least reliable component of conventional laminating machines.

Accordingly, it is desirable to provide a method and system for fabricating composite items that is capable of overcoming the disadvantages described herein at least to some extent.

SUMMARY OF THE INVENTION

The foregoing needs are met, to a great extent, by the present invention, wherein in some embodiments a system for fabricating laminated composite items and a method of using such a system is provided.

An embodiment of the present invention relates to a method of applying a course on a layup mold. In this method, a ply boundary that defines a ply area on the layup mold is determined and a tape of composite material is applied on the ply area at an oblique angle relative to the ply boundary. In addition, a leading edge of the tape is butt cut and the leading edge and the ply boundary essentially converge. Furthermore, a trailing edge is generated. The trailing edge is a butt cut and the trailing edge and the ply boundary essentially converge.

Another embodiment of the present invention pertains to a method of fabricating a transition zone in a composite item. The transition zone defines an area that begins at a first skin gauge and ends at a second skin gauge. The transition zone includes a first oblique ply boundary that is offset from a second oblique ply boundary. In this method, a first set of tapes of composite material is applied across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, a second set of tapes of composite material is applied across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

Yet another embodiment of the present invention relates to a computer readable medium on which is embedded computer software comprising a set of instructions for executing a method of applying a course on a layup mold. In this method, a ply boundary that defines a ply area on the layup mold is determined and a tape of composite material is applied on the ply area at an oblique angle relative to the ply boundary. In addition, a leading edge of the tape is butt cut and the leading edge and the ply boundary essentially converge. Furthermore, a trailing edge is generated. The trailing edge is a butt cut and the trailing edge and the ply boundary essentially converge.

Yet another embodiment of the present invention pertains to a computer readable medium on which is embedded computer software comprising a set of instructions for executing a method of fabricating a transition zone in a composite item. The transition zone defines an area that begins at a first skin gauge and ends at a second skin gauge. The transition zone includes a first oblique ply boundary that is offset from a second oblique ply boundary. In this method, a first set of tapes of composite material is applied across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, a second set of tapes of composite material is applied across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

Yet another embodiment of the present invention relates to an apparatus for applying a course on a layup mold. The apparatus includes a means for determining a ply boundary that defines a ply area on the layup mold and a means for applying a tape of composite material on the ply area at an oblique angle relative to the ply boundary. A leading edge of the tape is butt cut and the leading edge and the ply boundary essentially converge. In addition, the apparatus includes a means for generating a trailing edge. The trailing edge is a butt cut and the trailing edge and the ply boundary essentially converge.

Yet another embodiment of the present invention pertains to an apparatus for fabricating a transition zone in a composite item. The transition zone defines an area that begins at a first skin gauge and ends at a second skin gauge. The transition zone includes a first oblique ply boundary that is offset from a second oblique ply boundary. The apparatus includes a means for applying a first set of tapes of composite material across the first oblique ply boundary. Each of the first set of tapes includes a respective end that is butt cut and each of the first set of tapes includes a respective centerline. For each of the first set of tapes, the respective end and the respective centerline essentially converge upon the first oblique ply boundary. In addition, the apparatus includes a means for applying a second set of tapes of composite material across the second oblique ply boundary. Each of the second set of tapes includes a respective end that is butt cut and each of the second set of tapes includes a respective centerline. For each of the second set of tapes, the respective end and the respective centerline essentially converge upon the second oblique ply boundary. The respective ends of the second set of tapes are offset from the respective ends of the first set of tapes to generate a crenulated pattern.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides, in some embodiments, a system for placing plies to fabricate a composite item and a method of using this system. In various embodiments, the system includes an automated lamination device such as, for example, an automated fiber placement (AFP) machine, flat tape lamination machine (FTLM), numerically controlled (NC) contoured tape lamination machine (CTLM), multi-head tape lamination machine (MHTLM), and the like. This lamination device includes one or more dispensing heads to place plies of composite material upon a mandrel, layup mold or tool. In addition, the lamination device includes a cutting device to cut the composite material.

Figure 1:
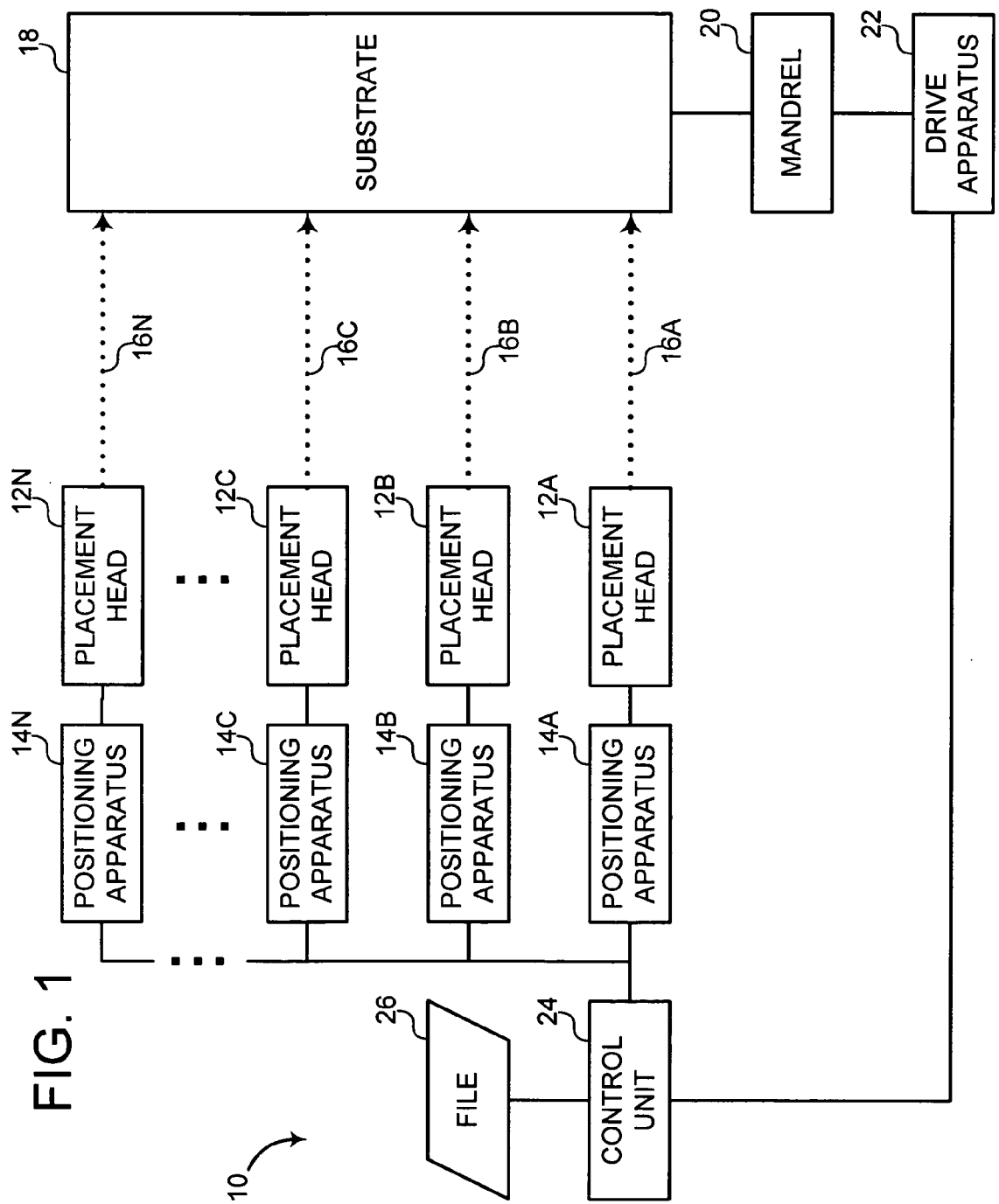
FIG. 1 is a block diagram of a tape lamination machine suitable for use with an embodiment of the invention.

The invention will now be described with reference to the drawing figures, in which like reference numerals refer to like parts throughout. FIG. 1 is a block diagram of a multi-head tape lamination machine (MHTLM) 10 according to an embodiment of the invention. As shown in FIG. 1, the MHTLM 10 includes a set of placement heads 12a-12n that are positioned by a respective set of positioning devices 14a-14n. The placement heads 12a-12n are configured to place 16a-16n composite material upon a substrate 18. The substrate 18 includes the surface of a mandrel 20 or other such form and/or tool. In addition, the substrate 18 includes any previously applied composite material, tackifier, and the like that is on the mandrel 20. The mandrel 20 is rotated or otherwise positioned by a drive apparatus 22. The drive apparatus 22 and/or the positioning devices 14a-14n are controlled by a control unit 24. The control unit 24 accesses a file 26 that includes computer readable instructions for fabricating a composite item.

Figure 2:
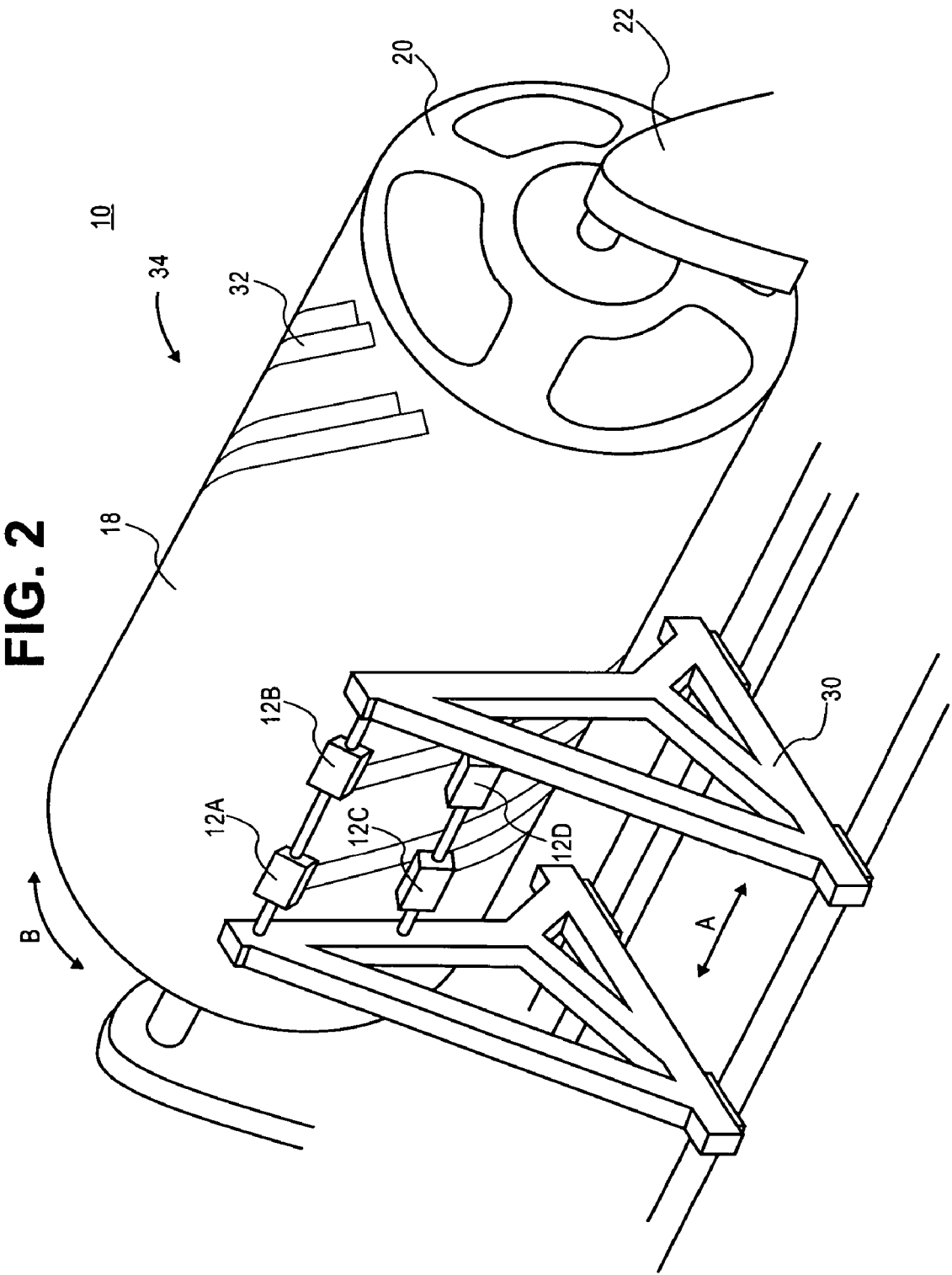
FIG. 2 is a perspective view of a tape lamination machine suitable for use with an embodiment of the invention.

FIG. 2 is a perspective view of a multi-head tape lamination machine (MHTLM) 10 according to an embodiment of the invention. As shown in FIG. 2, the MHTLM 10 includes a frame 30 to position the placement heads 12a-12d relative to the substrate 18. The frame 30 and substrate 18 are configured to move in directions A and B relative to one another. In addition, each of the placement heads 12a-12d may independently enjoy one or more axes of freedom relative to one another and/or the frame 30. For example, each placement head 12a-12d may independently move about 5, 6, or the like axes. In this manner, some or all of the placements heads 12a-12d are configured to place respective strips of a tape 32 upon the substrate 18. The tape 32 includes any suitable material to fabricate a composite item 34. Examples of suitable materials include metal foils, films, fibers, and the like. These material may be coated or impregnated with resin. In a particular example, the tape 32 includes carbon fibers that are pre-impregnated with a thermoset resin (pre-preg). In another example, the tape 32 includes a titanium foil that is coated with a resin. The composite item 34 includes any suitable item or part that may be fabricated with the tape 32. Particular examples include wing and fuselage components for an aircraft.

Figure 3:
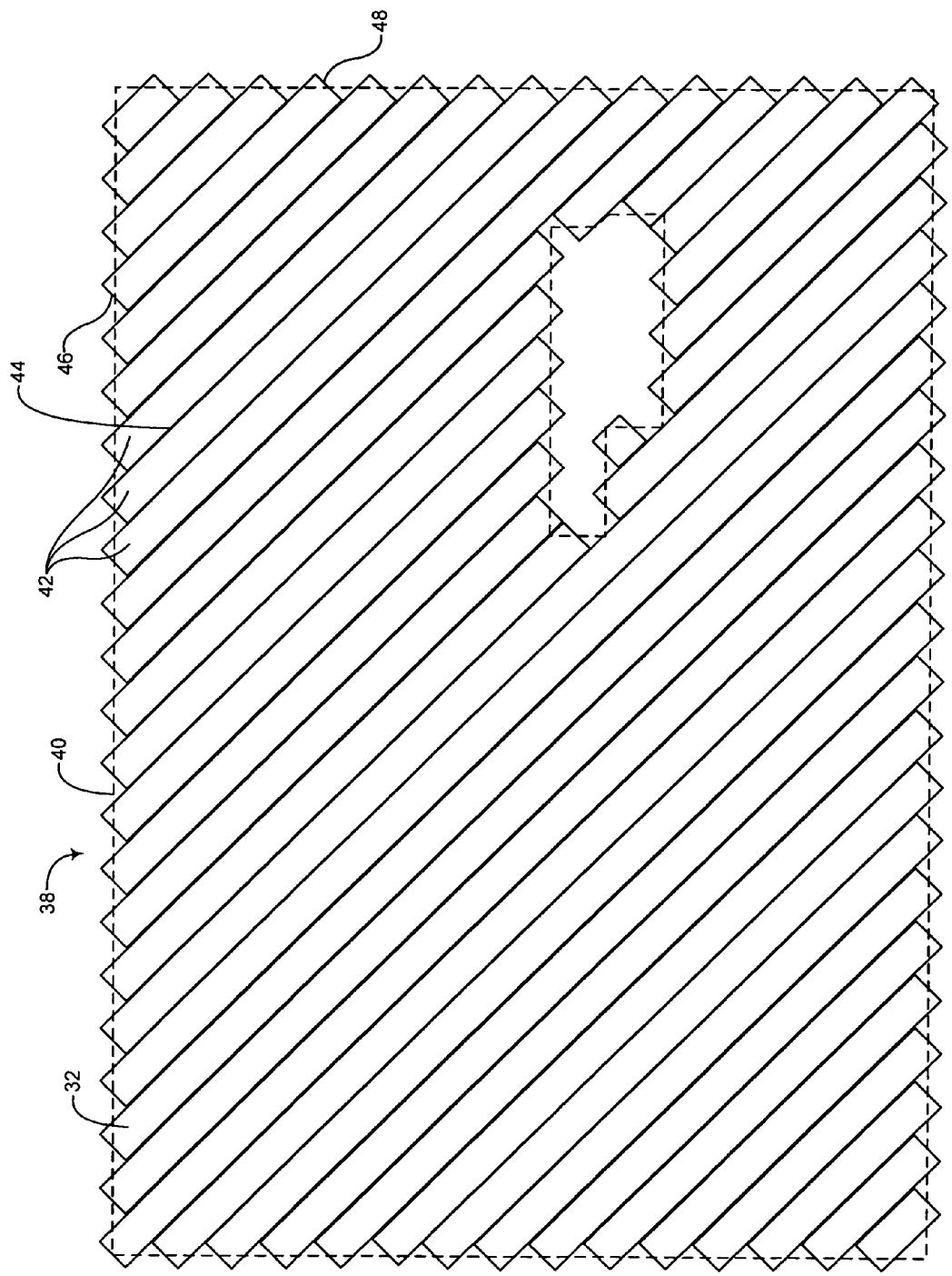
FIG. 3 is a diagram of a ply suitable for use with the embodiment of the invention illustrated in FIG. 1.

FIG. 3 is a diagram of a ply 38 suitable for use with the embodiment of the invention illustrated in FIG. 1. As shown in FIG. 3, the ply 38 includes a ply boundary 40 that defines the edges of the ply 38. Of note, the ply 38 includes a plurality of courses 42 that are oriented at about 45° relative to the lines of the ply boundary 40. The ply 38 further includes a plurality of course interfaces 44 disposed between adjacent courses 42. The courses 42 generally include a leading edge 46 and a trailing edge 48. While a 45° is illustrated in FIG. 3, the courses 42 may be oriented at any suitable angle relative to the ply 38 or substrate 18. For example the courses 42 may be oriented at 0°, 90°, +/−45° and the like. When oriented at 0° and 90°, the leading edge 46 and trailing edge 48 of the tape 32 may be positioned to essentially coincide with the ply boundary 40. As such, course orientation of 0° and 90° are relatively straightforward, and thus, will not be discussed further herein. In an embodiment, at any oblique angle or orientations other than 0° and 90, some portion of one or both of the leading edge 46 and trailing edge 48 may extend beyond the ply boundary 40 as shown in FIG. 3.

Figure 4:
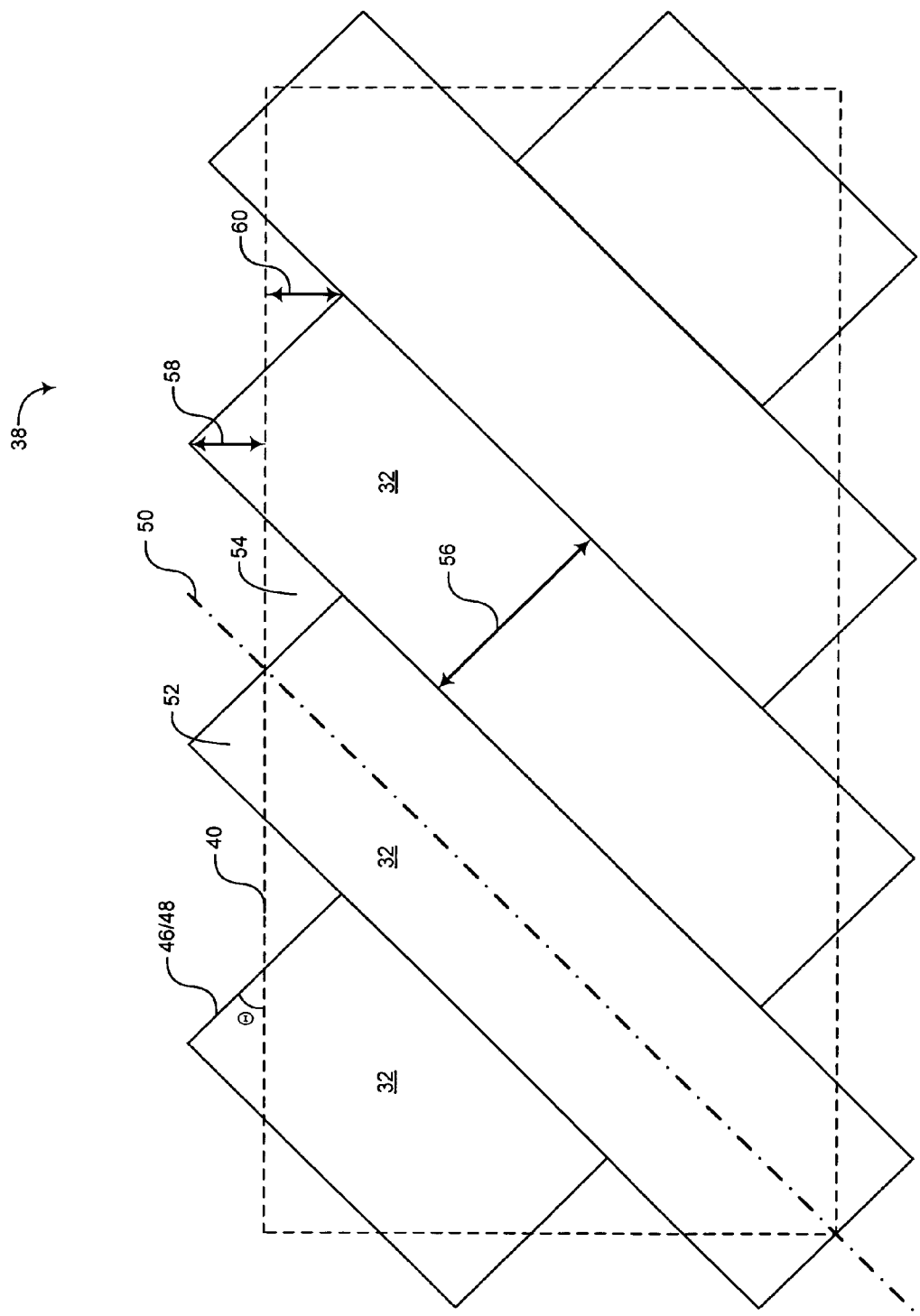
FIG. 4 is a detailed view of a ply suitable for use with the embodiment of the invention illustrated in FIG. 1.

FIG. 4 is a detailed view of the ply 38 suitable for use with the embodiment of the invention illustrated in FIG. 1. As shown in FIG. 4, the tape 32 includes a center line 50. In an embodiment, the tape 32 is positioned upon the ply 38 such that the center line 50, the ply boundary 40, and the leading edge 46 or trailing edge 48 essentially converge or intersect. As such, a portion or a corner of the tape 32 extends to either side of the ply boundary 40 resulting in an overfill 52 and an underfill 54. In a particular example in which the tape 32 is applied at a 45° to the ply boundary 40, the tape 32 includes a width (W) 56 and the overfill 52 includes a height (h) 58 that may be described by the equation:

$$h = \frac{W}{2\sqrt{2}} \qquad \text{Eqn. 1}$$

Utilizing the above Eqn. 1, given the width 56 of 3 inches (7.62 cm), the height 58 is approximately equal to 1.06 inches (2.69 cm). Similarly, a height 60 of the underfill 54 is essentially equal to the height 58. More generally, for any oblique angle, the heights 58 and 60 may be described by the equation:

$$h = \frac{W(\text{SIN}\theta)}{n} \qquad \text{Eqn. 2}$$

Where Θ is an angle of incidence (in Radians) between the ply boundary 40 and the leading or trailing edge 46/48 and where n≧1. In this regard, depending upon the tape cutting mechanism of the placement head 12a-12n, the leading and trailing edges 46 and 48 may be cut at about 80° to about 100° relative to the center line 50. More particularly, the leading and trailing edges 46 and 48 may be cut at about 85° to about 95° relative to the center line 50. This variance from 90° is related to the design of the cutting assembly and the speed that the tape 32 is moving as the cut is taking place. In addition, with regard to n being greater than or equal to 1, the leading and/or trailing edges 46/48 may be disposed any suitable location along the ply boundary 40. Depending upon the particular application, n may be set to a specific value. However, in other applications, n (i.e., the amount the leading/trailing edges 46/48 overlap the ply boundary 40) may vary from ply to ply or even within a given ply. In a particular example, n=2 which results in an overlap of about 50%. In this example, the leading/trailing edges 46/48, ply boundary 40, and center line 50 all essentially converge.

Figure 5:
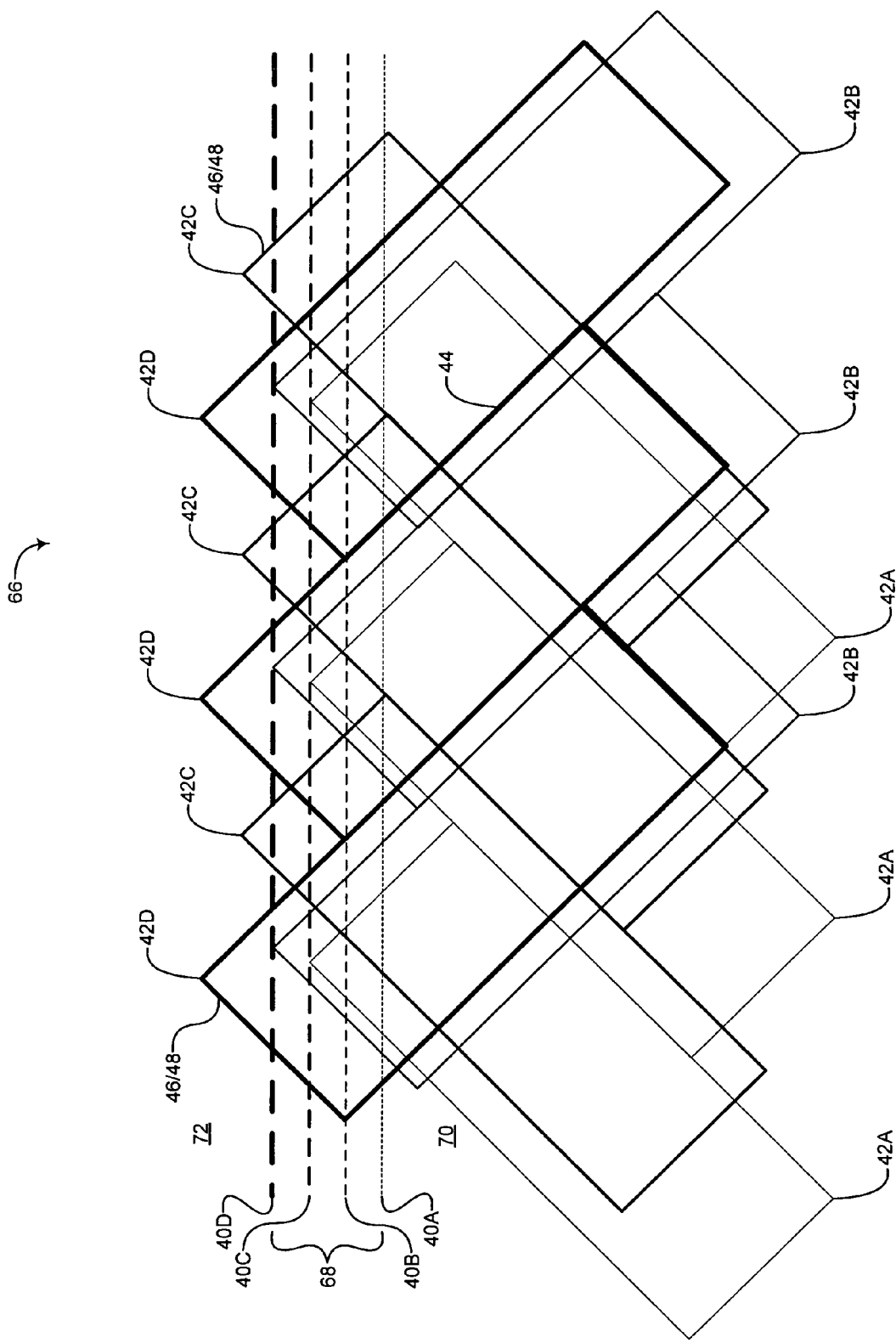
FIG. 5 is a diagram of ply placement schema suitable for use with the embodiment of the invention illustrated in FIG. 1.

FIG. 5 is a diagram of a ply placement schema 66 suitable for use with the embodiment of the invention illustrated in FIG. 1. The ply placement schema 66 may be utilized to place a plurality of plies 38a-38n along a transition zone 68. The transition zone 68 defines an interface between a first area 70 of the composite item 34 having a first thickness or "skin gauge" and a second area 72 of the composite item 34 having a second skin gauge. Differences in the skin gauges between the first area 70 and the second area 72 are accomplished by altering the number of the plies 38a-38n. That is, to generate a relatively stronger or thicker area on the composite item 34, a relatively greater number of the plies 38a-38n are applied to the substrate 18. The plies 38a-38n include respective ply boundaries 40a-n that are spaced across the transition zone 68. In addition, the plies 38a-38n are staggered as shown in FIG. 5 such that the leading and trailing edges 46/48 and/or the interfaces 44 do not coincide. This crenulation or spacing and staggering eases or smoothes the transition zone 68. In this manner, transitions that are structurally sound, cosmetically appealing, and/or aerodynamically favorable may be generated quickly and efficiently.

In applications where the ply boundary 40 is outside of net trim (e.g., outside of an area that will be cut off in subsequent processing), there is no issue with one ply 38 interacting with the other plies 38 in the composite item 34. However, in the transition zone 68 or other ply ramp regions, where many plies 38 are terminated within a short distance, the interactions of crenulations through the thickness of the composite item 34 are relatively more important. Ply ramps typically occur in fuselage structures at a 20:1 ratio. Thus, given a ply thickness of 0.0074 inches (0.188 mm), the ply boundaries 40a-40n may be positioned 0.0074*20=0.148 inches (3.76 mm) apart.

In a particular embodiment shown in FIG. 5, the transition zone 68 includes four +/−45° plies 38a-38d (two +45° and two −45°). For the sake of clarity, 0° and/or 90° plies that may be placed within the transition zone 68 have not been shown. However, typical ply orientation sequence from ply to ply is 45°/90°/−45°/0°. If present, these or other plies placed in between the plies 38a-38d may have respective ply boundaries that fall between the ply boundaries 40a-40d. In a particular example, if a 0° ply is disposed between the plies 38a and 38b, the 0° ply may include a ply boundary disposed about ½ of the distance between ply boundary 40a and 40b. If a 90° ply is disposed between the plies 38b and 38c, the 90° ply may include a ply boundary about ½ of the distance between ply boundary 40b and 40c. The spacing of the ply boundaries 40a-40n is determined by the ply ramp ratio. Typical ramp ratios for aerospace applications include about a 20:1 or the like. However, various embodiments of the invention include any suitable ramp ratio.

It is a benefit of embodiments of the present invention that head complexity may be reduced due to the relatively simplified cuts as compared to conventional tape placement devices. The simplification of the cuts results in increased head reliability and the ability to utilize multiple heads on a single machine to dramatically increase productivity of composite lay-up machines. In contrast, deliver heads of conventional tape placement machines are not reliable enough to use multiple heads at a single time.

It is an additional benefit of various embodiments that relatively wider tapes may be utilized. When compared to tape utilized by conventional fiber placement machines, the use of relatively wider tapes results in more robust mechanisms, improved head reliability, and increased total width of material capable of being placed by a single machine, resulting in dramatic improvements in machine productivity and reliability.

It is yet another benefit of various embodiments that the leading and trailing ends 46/48 are essentially the same. In conventional ply placement devices, after cutting the trailing end to exactly match the ply boundary, the placement head must move outside the placement area to cut a leading edge profile that matches the beginning of the next course. This process in conventional ply placement devices wastes time and materials. Embodiments of the invention, by virtue of having the leading and trailing edges 46/48 being essentially the same, omit this time consuming operation and do not waste these expensive materials.

It is yet another benefit of various embodiments of the present invention that existing composite items may be fabricated in accordance with embodiments of the invention with little or no modification to the existing fabrication instructions. In particular, parts fabricated with inner mold line ("IML") tooling and/or semi rigid outer mold line ("OML") tooling or caul sheets such as used on 787 fuselage components, may be fabricated according to embodiments of the invention. The IML tool surface is sculpted to match ply thickness variations so that the OML may remain smooth. In these and other instances, improper location of the composite material may result in OML surface variations beyond acceptable limits. Thus, embodiments of the invention provide sufficient control of material or ply placement to generate acceptable OML surface and laminate quality when replacing directly the fiber placement process without any substantial changes to ply boundaries designed for conventional fiber placement machines.

Figure 6:
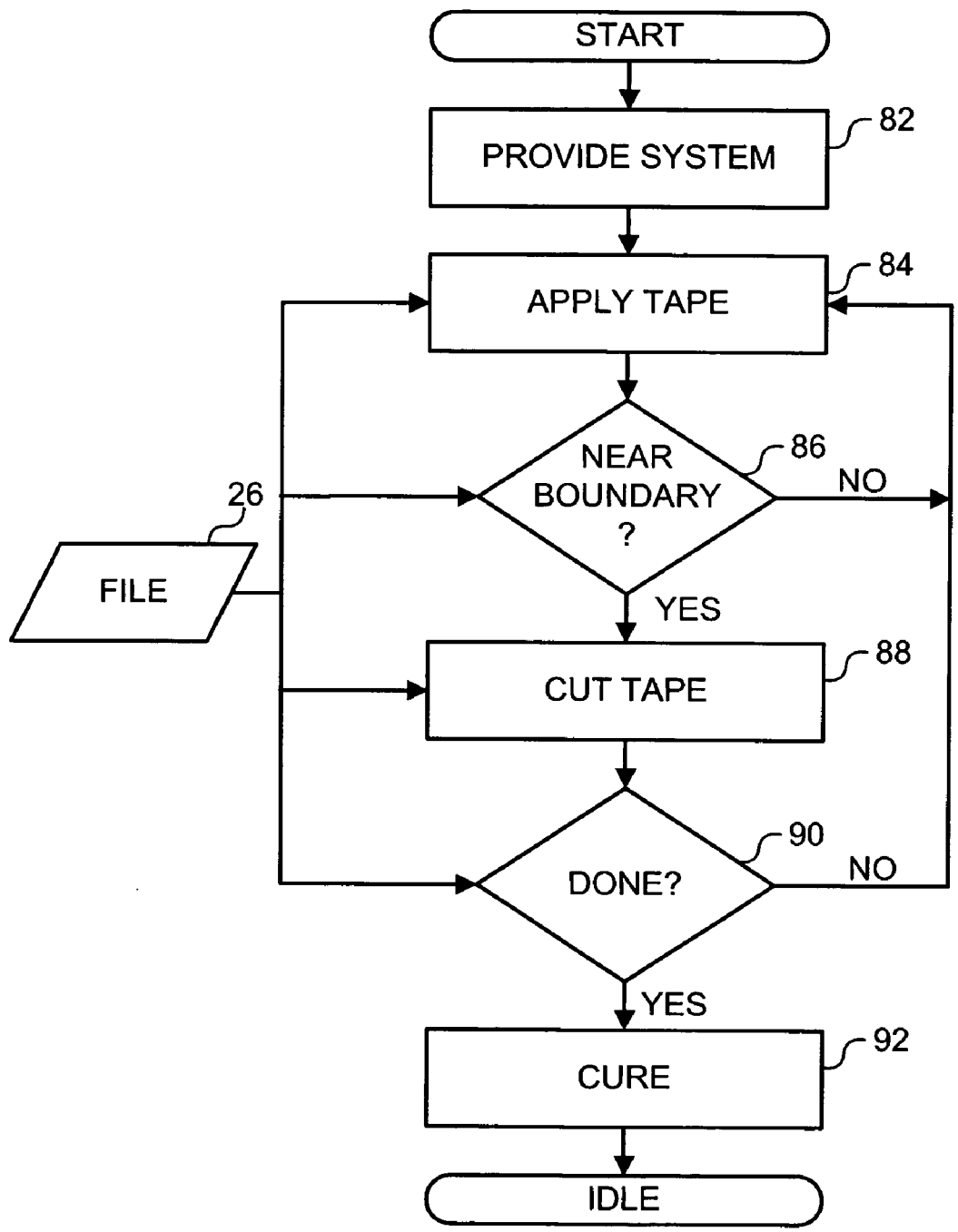
FIG. 6 is a flow diagram for a method of laying tape courses according to an embodiment of the invention.

FIG. 6 is a flow diagram for a method 80 of laying tape courses according to an embodiment of the invention. Prior to initiation of the method 60, a variety of preparation may occur. Examples of pre-initiation preparation may include one or more of: design the composite item 34; generate the file 26 corresponding to the composite item 34; generate the mandrel 20 corresponding to the composite item 34; acquire fabrication materials such as the tape 32; and the like. As shown in FIG. 6, the method 80 is initiated in response to providing a system such as the MHTLM 10.

At step 84, the tape 32 is applied to the substrate 20. For example, the file 26 is accessed to determine the ply boundaries 40a-40n. Based upon these ply boundaries 40a-40n, the drive apparatus 22 and/or the positioning apparatus 14a-14n are controlled by the control unit 24 to position the placement heads 12a-12n. Thereafter, the placement heads 12a-12n are controlled to place or apply the tape 32.

At step 86, it is determined whether one or more of the placement heads 12a-12n is approaching an end point or ply boundary 40a-40n. For example, the file 26 is accessed and the current position of the placement heads 12a-12n may be compared to the ply boundaries 40a-40n. In response to it being determined that one or more of the placement heads 12a-12n is approaching an end point or ply boundary 40a-40n, the tape 32 may be cut at step 88. Otherwise, the placement heads 12a-12n may be controlled to continue placing the tape 32 at step 84.

At step 88, the tape 32 is cut. For example, the control unit 24 may control the placement head 12a-12n to cut the tape 32 in response to the approaching ply boundary 40a-40n. In various embodiments of the invention, the cut is a butt cut. That is, the cut is about perpendicular to the centerline 50 of the tape 32. In an embodiment, the cut may be timed such that when the tape 32 is placed upon the substrate 18, the cut or trailing edge 48 coincides with the ply boundary 40a-40n.

At step 90, it is determined whether the layup is completed. For example, the file 26 is accessed to determine if there are any further instructions or an end of file ("EOF") identifier is reached. If it is determined that the layup is complete, the composite item 34 may be cured at step 170. If it is determined that the layup is not complete, the tape may be applied at step 84.

At step 92, the composite item 34 is cured. For example, the composite items is placed is a heated and/or pressurized environment to cure the resin in the tape 32.

Following the step 90, the MHTLM 10 may idle or stop until controlled to initiate the method 80 again.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of applying a course on a layup mold, the method comprising:
   determining a ply boundary that defines a ply area on the layup mold;
   applying a tape of composite material on the ply area at an oblique angle relative to the ply boundary, the tape having a centerline and a leading edge being cut at an angle of between about 80° to about 100° relative to the centerline, the leading edge and the ply boundary essentially converging;
   generating a trailing edge, the trailing edge being cut at an angle of between about 80° to about 100° relative to the centerline, the trailing edge and the ply boundary essentially converging; and
   staggering the leading and trailing edges of the tape in relation to the leading and trailing edges of tape of at least one other ply such that, within a transition zone, the intersections of the centerline of the tape with the leading and trailing edges thereof are non-coincident with the intersections of the centerline of the tape of the at least one other ply with the leading and trailing edges thereof, the leading and trailing edges of the tape of the at least one other ply being cut at an angle of between about 80° to about 100° relative to the tape centerline thereof.

2. The method according to claim 1, further comprising:
   generating an overfill having an overfill height described by the following equation:

overfill height=$W(\sin \theta)/n$

W being defined as a width of the tape, θ being defined as an angle of incidence in Radians between the ply boundary and the leading edge, and $n \geq 1$.

3. The method according to claim 2, further comprising:
   applying the tape at a 45° angle relative to the ply boundary, the overfill height being described by the following equation:

overfill height=$W/2\sqrt{2}$

4. The method according to claim 3, further comprising:
   generating an underfill having an underfill height being about equal to the overfill height.

5. The method according to claim 1, further comprising:
   applying the tape at a 90° angle relative to the ply boundary, the leading edge essentially coinciding with the ply boundary.

6. The method according to claim 1 wherein the tape is oriented at an angle of about 45° relative to the ply boundary.

7. The method according to claim 1 wherein the tape is oriented at an angle of at least one of about 45° and about 90° relative to the tape of the other ply.

8. A method of applying a course on a layup mold, the method comprising:
   determining a ply boundary defining a ply area on the layup mold;
   applying a tape of composite material on the ply area at an oblique angle relative to the ply boundary, the tape including a centerline and having a leading edge, the leading edge and the ply boundary essentially converging;
   generating a trailing edge, the trailing edge and the ply boundary essentially converging;
   staggering the leading and trailing edges of the tape in relation to the leading and trailing edges of tape of at least one other ply such that, within a transition zone, the intersections of the centerline of the tape with the leading and trailing edges thereof are non-coincident with the intersections of the centerline of the tape of the at least one other ply with the leading and trailing edges thereof, the leading and trailing edges and the centerline converging upon the ply boundary; and cutting at least one of the leading and trailing edges at an angle of between about 80° to about 100° relative to the centerline.

9. A method of applying a course on a layup mold for forming a composite item, the method comprising:

determining a ply boundary that defines a ply area on the layup mold;

applying a tape of composite material on the ply area at an angle of about 45° relative to the ply boundary, the tape having a centerline and a leading edge being cut at an angle of between about 80° to about 100° relative to the centerline, the leading edge, the centerline and the ply boundary converging, the tape being applied at an angle of at least one of about 45° and about 90° relative to the tape of at least one other ply;

generating a trailing edge being cut at an angle of between about 80° to about 100° relative to the centerline, the trailing edge, the centerline and the ply boundary converging;

staggering the leading and trailing edges of the tape in relation to the leading and trailing edges of the tape of the at least one other ply such that, within a transition zone, the intersections of the centerline of the tape with the leading and trailing edges thereof are non-coincident with the intersections of the centerline of the tape of the at least one other ply with the leading and trailing edges thereof; and cutting the leading and trailing edges of the tape of the at least one other ply at an angle of between about 80° to about 100° relative to the centerline.

* * * * *